F. A. HEK.
TOOL.
APPLICATION FILED JAN. 21, 1911.
1,011,343.
Patented Dec. 12, 1911
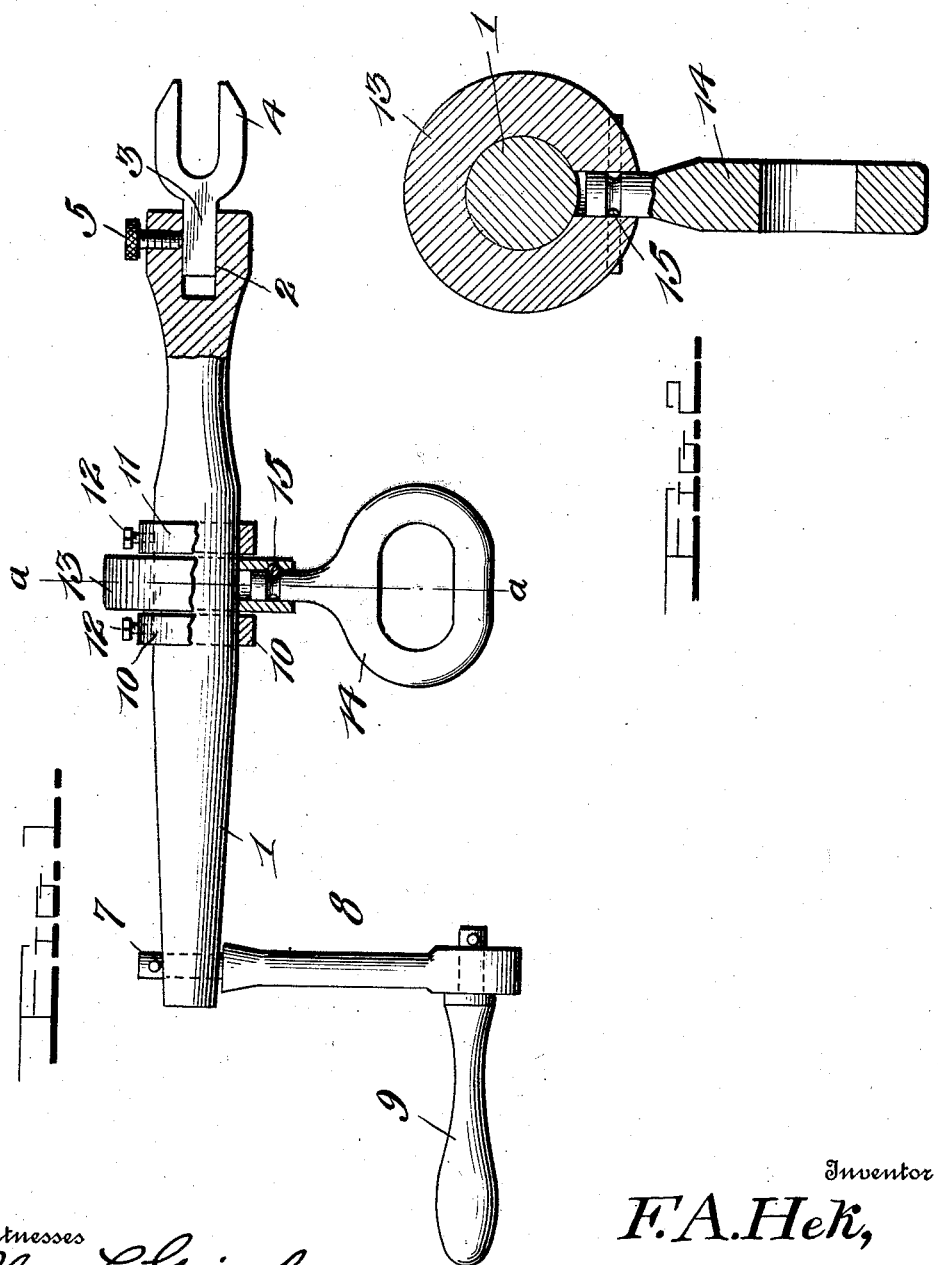
Inventor
F. A. Hek,
By Watson E. Coleman.
Attorney
Witnesses
Chas. L. Griesbauer.

UNITED STATES PATENT OFFICE.

FREDERICK A. HEK, OF ROANOKE, VIRGINIA.

TOOL.

1,011,343.   Specification of Letters Patent.   Patented Dec. 12, 1911.

Application filed January 21, 1911. Serial No. 603,919.

*To all whom it may concern:*

Be it known that I, FREDERICK A. HEK, a citizen of the United States, residing at Roanoke, in the county of Roanoke and State of Virginia, have invented certain new and useful Improvements in Tools, of which the following is a specification, reference being had to the accompanying drawings.

This invention is an improved tool for use as a wrench for setting up and taking off nuts and the like, for use as a reamer, and also for use for cutting screw threads and other analogous purposes, the invention consisting in the construction, combination and arrangement of devices hereinafter described and claimed.

In the accompanying drawings—Figure 1 is partly an elevation and partly a section of the tool constructed in accordance with my invention showing the same arranged for use as a nut wrench. Fig. 2 is a transverse sectional view of the same on the plane indicated by the line $a$—$a$ of Fig. 1.

In accordance with my invention, I provide a stem or shank 1, of cylindrical form and of suitable dimensions which is provided at one end with a socket 2 for the reception of the shank 3 of a tool head 4, and is also provided with a set screw 5 for engaging the shank of the tool head, and securing the same in place, and yet so that the tool head may be detached from the socket and another substituted in its stead at will.

At the opposite end of the shank 1, is a transverse opening 6 to receive a reduced stem 7 at the inner end of a crank 8, the said crank being provided with a handle 9, whereby it may be readily turned in order to turn the shank 1 of the tool and the tool head carried thereby. A pair of collars 10, 11 are slipped and are adjustable on the shank 1, so that they may be disposed at any desired place thereon, and each of the said collars is provided with a set screw 12 for clamping it in place on the said stem. A collar 13 is loose on and forms a bearing for the shank or stem 1, and is disposed between the collars 10, 11 and hence the said collar 13 may be shifted to any desired point on the shank or stem. The said collar 13 is at the inner end of a handle 14, and in connection with the collars 10, 11 forms a swivel connection between the said handle 14 and the shank or stem 1.

When in use, as a wrench, the workman grasps the handle 14 with his left hand and engages the tool head with the nut or bolt to be turned, and he then grasps the handle of the crank and turns the same so as to cause the shank 1, together with the tool head to turn so as to set up or take off the nut or bolt or other object with which the tool head is engaged. In practice I employ in connection with the shank, a number of tool heads of different sizes and kinds, for instance a number of wrench heads of different sizes, any one of which may be used at will according to the size of the nut or bolt, and also one or more reaming heads, and one or more taps or thread cutting dies, so that the tool may be used not only for the purposes of a wrench, but also as a reamer, and as a tool for cutting screw threads.

I do not limit myself as to the number or kind of the tool heads, used in connection with the device, as many different kinds of tool heads may be thus employed within the scope of my invention.

I claim:—

The herein described tool comprising a tool head having a shank, a stem having a socket to receive the said shank of the tool head, a crank for turning the said stem together with the tool head, a pair of securing collars adjustable on the stem and each having means for locking the same thereto, and a handle having a head or collar forming a bearing for the stem and disposed between the said adjustable collars and coacting therewith to form a swivel connection between the said stem and the said handle, the said handle together with the said collars being adjustable endwise on the said stem.

In testimony whereof I hereunto affix my signature in the presence of two witnesses.

FRED. A. HEK.

Witnesses:
S. H. MAYTT,
J. L. HILL.